United States Patent [19]

Kanda et al.

[11] Patent Number: 4,661,266
[45] Date of Patent: Apr. 28, 1987

[54] COMPLETION AND WORKOVER FLUIDS

[75] Inventors: Shoichi Kanda, Kanagawa; Makoto Yanagita, Tokyo; Yukihiko Sekimoto, Saitama, all of Japan

[73] Assignee: Nitto Chemical Industry Co., Ltd., Tokyo, Japan

[21] Appl. No.: 755,506

[22] Filed: Jul. 16, 1985

[30] Foreign Application Priority Data

| Jul. 16, 1984 | [JP] | Japan | 59-0147347 |
| Jul. 16, 1984 | [JP] | Japan | 59-147348 |
| Jul. 16, 1984 | [JP] | Japan | 59-147349 |
| Jul. 16, 1984 | [JP] | Japan | 59-147351 |
| Jul. 16, 1984 | [JP] | Japan | 59-147352 |

[51] Int. Cl.$^4$ .............................................. E21B 43/00
[52] U.S. Cl. .............................. 252/8.551; 252/315.3; 536/88; 536/96
[58] Field of Search ............. 252/8.5 A, 8.5 B, 8.5 C, 252/8.55 R, 315.3; 536/88, 96

[56] References Cited

U.S. PATENT DOCUMENTS

| 3,852,201 | 12/1974 | Jackson | 252/8.5 |
| 4,317,758 | 3/1982 | Bruning | 524/202 |
| 4,330,414 | 5/1982 | Hoover | 252/8.5 |
| 4,350,601 | 9/1982 | Mosier et al. | 252/315.3 X |
| 4,359,392 | 11/1982 | Rygg | 536/88 X |
| 4,392,964 | 7/1983 | House et al. | 252/8.5 |
| 4,514,318 | 4/1985 | Rodriguez | 252/315.3 |

Primary Examiner—Herbert B. Guynn
Attorney, Agent, or Firm—Sughrue, Mion, Zinn, Macpeak & Seas

[57] ABSTRACT

A completion and workover fluid which comprises an aqueous liquid medium containing hydroxyethyl cellulose, an inorganic salt selected from the group consisting of calcium chloride, calcium bromide and zinc bromide, and a component selected from the group consisting of the following components:

(1) thiol derivatives of heterocyclic compounds;
(2) thioamide derivatives;
(3) at least one compound selected from the group consisting of thiuram disulfide compounds, thiuram monosulfide compounds and dithiocarbamate compounds;
(4) benzothiazole; and
(5) a copper compound and an iodine compound in combination.

3 Claims, No Drawings

COMPLETION AND WORKOVER FLUIDS

FIELD OF THE INVENTION

This invention relates to completion and workover fluids and, in more detail, to improved completion and workover fluids which have the ability of conveying deposits in the bottom of a well, e.g., an oil well, to the ground surface by preventing a reduction in rheological properties under high temperature conditions.

BACKGROUND OF THE INVENTION

Progress in drilling techniques in recent years has been remarkable, and the developments of drilling fluid materials suitable for subterranean formulations and techniques for controlling drilling fluids have permitted a high specific gravity under high temperature conditions to be maintained and swelling of Argillaceous Rock layers due to hydration to be controlled. Thus, it becomes possible to drill rock formations.

After completion of an oil well, oil production can be carried out. However, if drilling mud and solution filtering from a cement slurry penetrate into reservoirs which contain clay, the clay swells and plugs pores resulting in a reduction of permeability. Alternatively, when reservoirs of sandstone have not been fully concreted, sand flows into the well with the oil and gas and stands in the casing causing production difficulties such as a reduction in production capacity, etc. As countermeasures to eliminate these production problems, various workovers are carried out. In these cases, in order to minimize formation damage, it has been recently recomended to use completion and workover fluids which do not contain solids such as bentonite or barite, etc., such as drilling mud. Namely, completion and workover fluids used hitherto are those fluids wherein salts for obtaining a specific gravity sufficient to control the ground pressure, hydroxyethyl cellulose as viscosifier, which is not substantially affected by salts, and if necessary, various chemicals are dissolved or suspended in water.

However, the temperature in the well tends to rise as the well becomes deeper, and a reduction in rheological properties of the completion and workover fluids used hitherto results in the problem that the completion and workover fluids do not fully display their capability of cleaning the deposits in the well up to the ground surface. Thus, it has been found that the necessary working time is increased and the deposits can not be completely cleaned out. Accordingly, only when a method that is able to prevent a reduction of rheological properties of completion and workover fluids used hitherto can be found, does it become possible to fully enjoy the beneficial properties of such fluids.

SUMMARY OF THE INVENTION

An object of the present invention is to solve the above described problems. The present invention relates to completion and workover fluids which comprises an aqueous liquid medium containing hydroxyethyl cellulose, an inorganic salt selected from the group consisting of calcium chloride, calcium bromide and zinc bromide, and a component selected from the group consisting of the following components:

(1) thiol derivatives of heterocyclic compounds;
(2) thioamide derivatives;
(3) at least one compound selected from the group consisting of thiuram disulfide compounds, thiuram monosulfide compounds and dithiocarbamate compound;
(4) benzothiazole; and
(5) a combination of a copper compound and an iodine compound.

As will be seen from the examples described below, the completion and workover fluids of the present invention are superior from the standpoint that a reduction in their rheological properties under high temperature is extremely small, and thus it is possible to fully enjoy their beneficial properties.

DETAILED DESCRIPTION OF THE INVENTION

Suitable examples of thiol derivatives of heterocyclic compounds (1) which can be present in the completion and workover fluids of the present invention include benzoxazole-2-thiol (formula (1)), N-pyridineoxide-2-thiol (formula (2)), 1,3,4-thiadiazole-2,5-dithiol (formula (3)) and 4-ketothiazolidine-2-thiol (formula (4)), as shown below:

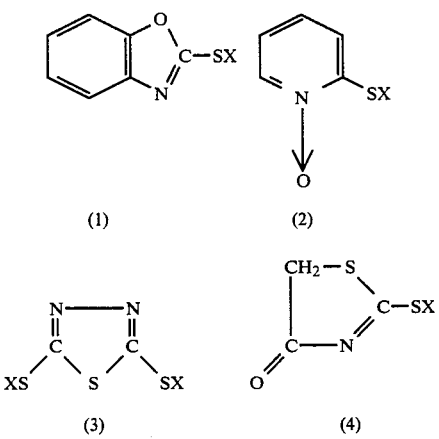

wherein X represents a hydrogen atom, an alkali metal atom, preferably Na and K, or an ammonium.

Examples of thioamide derivatives (2) which can be present in the completion and workover fluids of the present invention include thioacetamide, hydrazine carbothioamide and allyl thiocarbamide.

Representative examples of thiuram disulfide compounds, thiuram monosulfide compounds and dithiocarbamate compounds (3) which can be present in the completion and workover fluids of the present invention are those represented by the following formulae (5), (6) and (7), respectively.

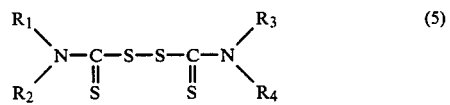

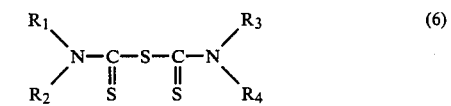

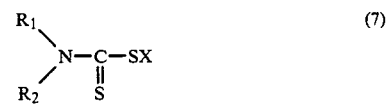

wherein $R_1$, $R_2$, $R_3$ and $R_4$, which may be the same or different, represents each a lower alkyl group, specifically, a methyl group or an ethyl group, and X represents a hydrogen atom, an alkali metal atom, preferably Na and K, or an ammonium.

Exemplary copper compounds in the combination (5) which can be present in the completion and workover fluids of the present invention include oxides, hydroxides, halides, sulfides, inorganic acid salts, organic acid salts and complex salts of copper. Specific examples of these compounds include cuprous oxide, cupric oxide, cuprous sulfide, cupric sulfide, cuprous chloride, cupric chloride, cuprous bromide, cupric bromide, basic copper chloride, cuprous cyanide, copper thiocyanate, cupric phosphate, basic copper carbonate, copper formate, copper acetate, copper oxalate, copper citrate, copper acrylate, copper naphthenate, ammonium cupric chloride, copper phthalocyanine, etc.

Representative iodine compounds in the combination (5) include sodium iodide, potassium iodide, ammonium iodide and calcium iodide.

Further, a special case of using a copper compound and an iodine compound in the combination (5) in the present invention is copper iodide which contains both copper and iodine in the same compound.

The completion and workover fluids of the present invention contain at least one of the above described Components (1) to (5). With respect to the Components (1) to (4), the amount which can be used in a range from about 0.001% by weight to about 0.2% by weight and, preferably, from about 0.005% by weight to about 0.1% by weight. If the amount is less than about 0.001% by weight, the effect is not sufficient. On the other hand, if the amount is above about 0.2% by weight, the effect is not further improved.

With respect to the combination of copper compound and iodine compound (5), the amount of the copper compound in the fluids is in the range from about 0.1 ppm to about 500 ppm and, preferably, from about 1 ppm to about 100 ppm, calculated as elemental copper, and the amount of the iodine compound is in the range from about 0.1 ppm to about 500 ppm and, preferably, from about 1 ppm to about 200 ppm, calculated as elemental iodine. The amount of the copper compound and the iodine compound in combination is determined generally so that the amount of elemental iodine of the iodine compound is in a range from about 0.01 part by weight to about 2 parts by weight based on 1 part by weight of elemental copper of the copper compound. If the amount and the ratio of combination are lower than the above described lowest values, a sufficient effect can not be obtained. On the other hand, if they are beyond the upper limit, the effect is not further improved.

Other components and the amounts thereof present in the completion and workover fluids used hitherto, which are the objects of intended improvements according to the present invention, are as follows. Namely, hydroxyethyl cellulose has a mean hydroxyethyl molar substitution of about 1.5 or more and a viscosity of 2,000 cp or more at 1% by weight (Brookfield Viscometer, No. 3 Spindle, 30 RPM, 25° C.), and its concentration in the completion and workover fluids is in a range of about 0.2% by weight to about 2% by weight. Also, salt is at least one selected from the group consisting of calcium chloride, calcium bromide and zinc bromide, and the type of salt and amount thereof can be determined by the specific gravity required (1.01 or more, preferably 1.16 to 2.30), the working temperature and crystallized temperature. The concentration of the salt in the fluids generally is in a range of from about 0.01% by weight to about 70% by weight. Furthermore, various other chemicals, which can be present, include defoamers, anticorrosives, pH control agents, fillers and suspension assistants.

In the completion and workover fluids of the present invention, the rheological properties after aging at a high temperature of about 80° C. or more, preferably at about 80° C. to about 150° C., i.e., the apparent viscosity (AV), the plastic viscosity (PV) and the yield point (YP) are high as compared with those of the fluids used hitherto, and they have superior capacities of conveying the deposits in the well.

The present invention is described in greater detail below by some representative examples. However, since reproducibilities of workover in a real well were difficult, the completion and workover fluids were aged in a Roller Oven at a high temperature and the above described rheological properties were measured using a Fann VG meter Model 35 (at 30° C.). Then, the completion and workover fluids of the present invention were compared with those used hitherto.

EXAMPLE 1

A completion and workover fluid used hitherto which comprised 35 parts by weight of calcium chloride, 0.5 part by weight of hydroxyethyl cellulose having a mean substitution mole number of 2.0 and a viscosity of 5,000 cp at 1% by weight (Brookfield Viscometer, No. 4 Spindle, 30 RPM, 25° C.) and 65 parts by weight of water, and a completion and workover fluid of the present invention which was prepared by adding 0.03 part by weight of benzoxazole-2-thiol to the above fluid were aged, respectively, in a Roller Oven at 110° C. for 16 hours. The rheological properties of the two fluids were then measured and the results obtained are shown in Table 1 below.

TABLE 1

| Completion and Workover Fluid | Specific Gravity | AV (cp) | PV (cp) | YP (lb/100 ft$^2$) |
|---|---|---|---|---|
| Fluid used hitherto | 1.35 | 16 | 15 | 1 |
| Fluid of the present invention | 1.35 | 70 | 46 | 47 |

EXAMPLE 2

A completion and workover fluid used hitherto which comprised 35 parts by weight of calcium chloride, 0.6 part by weight of the same hydroxyethyl cellulose as described in Example 1 and 65 parts by weight of water, and a completion and workover fluid of the present invention which was prepared by adding 0.01 part by weight of the Na salt of pyridineoxide-2-thiol to the above fluid were aged, respectively, in a Roller Oven at 120° C. for 20 hours. The rheological properties of the two fluids were then measured and the results obtained are shown in Table 2 below.

TABLE 2

| Completion and Workover Fluid | Specific Gravity | AV (cp) | PV (cp) | YP (lb/100 ft$^2$) |
|---|---|---|---|---|
| Fluid used hitherto | 1.35 | 20 | 19 | 2 |
| Fluid of the | 1.35 | 75 | 46 | 57 |

EXAMPLE 3

A completion and workover fluid used hitherto which comprised 35 parts by weight of calcium chloride, 0.4 part by weight of the same hydroxyethyl cellulose as described in Example 1 and 65 parts by weight of water, and a completion and workover fluid of the present invention which was prepared by adding 0.08 part by weight of 1,3,4-thiadiazole-2,5-dithiol to the above fluid were aged in a Roller Oven at 100° C. for 8 hours. The rheological properties of the two fluids were then measured and the results obtained are shown in Table 3 below.

TABLE 3

| Completion and Workover Fluid | Specific Gravity | AV (cp) | PV (cp) | YP (lb/100 ft²) |
|---|---|---|---|---|
| Fluid used hitherto | 1.35 | 17 | 16 | 1 |
| Fluid of the present invention | 1.35 | 52 | 30 | 47 |

EXAMPLE 4

A completion and workover fluid used hitherto which comprised 35 parts by weight of calcium chloride, 0.8 part by weight of the same hydroxyethyl cellulose as described in Example 1 and 65 parts by weight of water, and a completion and workover fluid of the present invention which was prepared by adding 0.02 part by weight of 4-ketothiazolidine-2-thiol to the above fluid were aged, respectively, in a Roller Oven at 140° C. for 16 hours. The rheological properties of the two fluids were then measured and the results obtained are shown in Table 4 below.

TABLE 4

| Completion and Workover Fluid | Specific Gravity | AV (cp) | PV (cp) | YP (lb/100 ft²) |
|---|---|---|---|---|
| Fluid used hitherto | 1.35 | 13 | 12 | 1 |
| Fluid of the present invention | 1.35 | 47 | 40 | 13 |

EXAMPLE 5

A completion and workover fluid used hitherto which comprised 27.5 parts by weight of calcium chloride, 27.2 parts by weight of calcium bromide, 0.3 part by weight of the same hydroxyethyl cellulose as described in Example 1 and 45.3 parts by weight of water, and a completion and workover fluid of the present invention which was prepared by adding 0.01 part by weight of pyridineoxide-2-thiol to the above fluid were aged in a Roller Oven at 130° C. for 48 hours. The rheological properties of the two fluids were then measured and the results obtained are shown in Table 5 below.

TABLE 5

| Completion and Workover Fluid | Specific Gravity | AV (cp) | PV (cp) | YP (lb/100 ft²) |
|---|---|---|---|---|
| Fluid used hitherto | 1.60 | 13 | 12 | 1 |
| Fluid of the present invention | 1.60 | 41 | 35 | 11 |

EXAMPLE 6

A completion and workover fluid used hitherto which comprised 35 parts by weight of calcium chloride, 0.8 part by weight of the same hydroxyethyl cellulose as described in Example 1 and 65 parts by weight of water, and a completion and workover fluid of the present invention which was prepared by adding 0.02 part by weight of thioacetamide to the above fluid were aged, respectively, in a Roller Oven at 120° C. for 24 hours. The rheological properties of the two fluids were then measured and the results obtained are shown in Table 6 below.

TABLE 6

| Completion and Workover Fluid | Specific Gravity | AV (cp) | PV (cp) | YP (lb/100 ft²) |
|---|---|---|---|---|
| Fluid used hitherto | 1.35 | 26 | 24 | 5 |
| Fluid of the present invention | 1.35 | 100 | 98 | 102 |

EXAMPLE 7

A completion and workover fluid used hitherto which comprised 35 parts by weight of calcium chloride, 0.4 part by weight of the same hydroxyethyl cellulose as described in Example 1 and 65 parts by weight of water, and a completion and workover fluid of the present invention which was prepared by adding 0.06 part by weight of hydrazine carbothioamide to the above fluid were aged, respectively, in a Roller Oven at 140° C. for 8 hours. The rheological properties of the two fluids were then measured and the results obtained are shown in Table 7 below.

TABLE 7

| Completion and Workover Fluid | Specific Gravity | AV (cp) | PV (cp) | YP (lb/100 ft²) |
|---|---|---|---|---|
| Fluid used hitherto | 1.35 | 13 | 12 | 1 |
| Fluid of the present invention | 1.35 | 29 | 25 | 10 |

EXAMPLE 8

A completion and workover fluid used hitherto which comprised 35 parts by weight of calcium chloride, 0.6 part by weight of the same hydroxyethyl cellulose as described in Example 1 and 65 parts by weight of water, and a completion and workover fluid of the present invention which was prepared by adding 0.01 part by weight of allylthiocarbamide to the above fluid were aged, respectively, in a Roller Oven at 110° C. for 16 hours. The rheological properties of the two fluids were then measured and the results obtained are shown in Table 8 below.

TABLE 8

| Completion and Workover Fluid | Specific Gravity | AV (cp) | PV (cp) | YP (lb/100 ft$^2$) |
| --- | --- | --- | --- | --- |
| Fluid used hitherto | 1.35 | 19 | 18 | 1 |
| Fluid of the present invention | 1.35 | 79 | 47 | 63 |

EXAMPLE 9

A completion and workover fluid used hitherto which comprised 35 parts by weight of calcium chloride, 0.6 part by weight of the same hydroxyethyl cellulose as described in Example 1 and 65 parts by weight of water, and a completion and workover fluid of the present invention which was prepared by adding 0.005 part by weight of thioacetamide to the above fluid were aged, respectively, in a Roller Oven at 120° C. for 12 hours. The rheological properties of the two fluids were then measured and the results obtained are shown in Table 9 below.

TABLE 9

| Completion and Workover Fluid | Specific Gravity | AV (cp) | PV (cp) | YP (lb/100 ft$^2$) |
| --- | --- | --- | --- | --- |
| Fluid used hitherto | 1.35 | 19 | 18 | 1 |
| Fluid of the present invention | 1.35 | 44 | 38 | 15 |

EXAMPLE 10

A completion and workover fluid used hitherto which comprised 27.5 parts by weight of calcium chloride, 27.2 parts by weight of calcium bromide, 0.4 part by weight of the same hydroxyethyl cellulose as described in Example 1 and 45.3 parts by weight of water, and a completion and workover fluid of the present invention which was prepared by adding 0.03 part by weight of allylthiocarbamide to the above fluid were aged, respectively, in a Roller Oven at 130° C. for 16 hours. The rheological properties of the two fluids were then measured and the results obtained are shown in Table 10 below.

TABLE 10

| Completion and Workover Fluid | Specific Gravity | AV (cp) | PV (cp) | YP (lb/100 ft$^2$) |
| --- | --- | --- | --- | --- |
| Fluid used hitherto | 1.60 | 10 | 11 | 1 |
| Fluid of the present invention | 1.60 | 44 | 37 | 13 |

EXAMPLE 11

A completion and workover fluid used hitherto which comprised 35 parts by weight of calcium chloride, 0.6 part by weight of the same hydroxyethyl cellulose as described in Example 1 and 65 parts by weight of water, and a completion and workover fluid of the present invention which was prepared by adding 0.03 part by weight of the Na salt of dimethyldithiocarbamic acid to the above fluid were aged, respectively, in a Roller Oven at 130° C. for 16 hours. The rheological properties of the two fluids were then measured and the results obtained are shown in Table 11 below.

TABLE 11

| Completion and Workover Fluid | Specific Gravity | AV (cp) | PV (cp) | YP (lb/100 ft$^2$) |
| --- | --- | --- | --- | --- |
| Fluid used hitherto | 1.35 | 10 | 9 | 0 |
| Fluid of the present invention | 1.35 | 35 | 32 | 6 |

EXAMPLE 12

A completion and workover fluid used hitherto which comprised 35 parts by weight of calcium chloride, 0.5 part by weight of the same hydroxyethyl cellulose as described in Example 1 and 65 parts by weight of water, and a completion and workover fluid of the present invention which was prepared by adding 0.01 part by weight of tetramethylthiuram disulfide to the above fluid were aged, respectively, in a Roller Oven at 120° C. for 16 hours. The rheological properties of the two fluids were then measured and the results obtained are shown in Table 12 below.

TABLE 12

| Completion and Workover Fluid | Specific Gravity | AV (cp) | PV (cp) | YP (lb/100 ft$^2$) |
| --- | --- | --- | --- | --- |
| Fluid used hitherto | 1.35 | 16 | 15 | 1 |
| Fluid of the present invention | 1.35 | 56 | 43 | 26 |

EXAMPLE 13

A completion and workover fluid used hitherto which comprised 35 parts by weight of calcium chloride, 0.8 part by weight of the same hydroxyethyl cellulose as described in Example 1 and 65 parts by weight of water, and a completion and workover fluid of the present invention which was prepared by adding 0.08 part by weight of tetramethylthiuram monosulfide to the above fluid were aged, respectively, in a Roller Oven at 110° C. for 32 hours. The rheological properties of the two fluids were then measured and the results obtained are shown in Table 13 below.

TABLE 13

| Completion and Workover Fluid | Specific Gravity | AV (cp) | PV (cp) | YP (lb/100 ft$^2$) |
| --- | --- | --- | --- | --- |
| Fluid used hitherto | 1.35 | 19 | 18 | 1 |
| Fluid of the present invention | 1.35 | 106 | 90 | 100 |

EXAMPLE 14

A completion and workover fluid used hitherto which comprised 35 parts by weight of calcium chloride, 0.6 part by weight of the same hydroxyethyl cellulose as described in Example 1 and 65 parts by weight of water, and a completion and workover fluid of the present invention which was prepared by adding 0.005 part by weight of diethyldithiocarbamic acid to the above fluid were aged, respectively, in a Roller Oven at 110° C. for 16 hours. The rheological properties of the two fluids were then measured and the results obtained are shown in Table 14 below.

TABLE 14

| Completion and Workover Fluid | Specific Gravity | AV (cp) | PV (cp) | YP (lb/100 ft²) |
|---|---|---|---|---|
| Fluid used hitherto | 1.35 | 16 | 15 | 1 |
| Fluid of the present invention | 1.35 | 28 | 24 | 6 |

EXAMPLE 15

A completion and workover fluid used hitherto which comprised 27.5 parts by weight of calcium chloride, 27.2 parts by weight of calcium bromide, 0.7 part by weight of the same hydroxyethyl cellulose as described in Example 1 and 45.3 parts by weight of water, and a completion and workover fluid of the present invention which was prepared by adding 0.01 part by weight of tetraethylthiuram monosulfide to the above fluid were aged, respectively, in a Roller Oven at 120° C. for 24 hours. The rheological properties of the two fluids were then measured and the results obtained are shown in Table 15 below.

TABLE 15

| Completion and Workover Fluid | Specific Gravity | AV (cp) | PV (cp) | YP (lb/100 ft²) |
|---|---|---|---|---|
| Fluid used hitherto | 1.60 | 28 | 26 | 3 |
| Fluid of the present invention | 1.60 | 113 | 101 | 118 |

EXAMPLE 16

A completion and workover fluid used hitherto which comprised 35 parts by weight of calcium chloride, 0.6 part by weight of the same hydroxyethyl cellulose as described in Example 1 and 65 parts by weight of water, and a completion and workover fluid of the present invention which was prepared by adding 0.02 part by weight of benzothiazole to the above fluid were aged, respectively, in a Roller Oven at 110° C. for 16 hours. The rheological properties of the two fluids were then measured and the results obtained are shown in Table 16 below.

TABLE 16

| Completion and Workover Fluid | Specific Gravity | AV (cp) | PV (cp) | YP (lb/100 ft²) |
|---|---|---|---|---|
| Fluid used hitherto | 1.35 | 13 | 12 | 1 |
| Fluid of the present invention | 1.35 | 73 | 47 | 51 |

EXAMPLE 17

A completion and workover fluid used hitherto which comprised 35 parts by weight of calcium chloride, 0.4 part by weight of the same hydroxyethyl cellulose as described in Example 1 and 65 parts by weight of water, and a completion and workover fluid of the present invention which was prepared by adding 0.01 part by weight of benzothiazole to the above fluid were aged, respectively, in a Roller Oven at 140° C. for 8 hours. The rheological properties of the two fluids were then measured and the results obtained are shown in Table 17 below.

TABLE 17

| Completion and Workover Fluid | Specific Gravity | AV (cp) | PV (cp) | YP (lb/100 ft²) |
|---|---|---|---|---|
| Fluid used hitherto | 1.35 | 10 | 9 | 0 |
| Fluid of the present invention | 1.35 | 32 | 29 | 6 |

EXAMPLE 18

A completion and workover fluid used hitherto which comprised 27.5 parts by weight of calcium chloride, 27.2 parts by weight of calcium bromide, 0.8 part by weight of the same hydroxyethyl cellulose as described in Example 1 and 45.3 parts by weight of water, and a completion and workover fluid of the present invention which was prepared by adding 0.01 part by weight of benzothiazole to the above fluid were aged, respectively, in a Roller Oven at 130° C. for 24 hours. The rheological properties of the two fluids were then measured and the results obtained are shown in Table 18 below.

TABLE 18

| Completion and Workover Fluid | Specific Gravity | AV (cp) | PV (cp) | YP (lb/100 ft²) |
|---|---|---|---|---|
| Fluid used hitherto | 1.60 | 20 | 19 | 2 |
| Fluid of the present invention | 1.60 | 101 | 95 | 100 |

EXAMPLE 19

A completion and workover fluid used hitherto which comprised 35 parts by weight of calcium chloride, 0.6 part by weight of the same hydroxyethyl cellulose as described in Example 1 and 65 parts by weight of water, and a completion and workover fluid of the present invention which was prepared by adding prescribed amount of cupric sulfate 5 hydrate and potassium iodide to the above fluid were aged, respectively, in a Roller Oven at 130° C. for 16 hours. The rheological properties of the two fluids were then measured.

For reference, similar procedures were carried out using cupric sulfate pentahydrate or potassium iodide alone. The results obtained are shown in Table 19 below.

All of the above described fluids have a specific gravity of 1.35.

TABLE 19

| Completion and Workover Fluid | Additive | Amount Added (As elemental copper, elemental iodine) (ppm) | AV (cp) | PV (cp) | YP (lb/100 ft²) |
|---|---|---|---|---|---|
| Fluid used hitherto | none | — | 13 | 12 | 0 |
| Fluid of the present invention | Cupric sulfate pentahydrate | 15 | 80 | 40 | 72 |
| | Potassium iodide | 15 | | | |
| Fluid of the present invention | Cupric sulfate pentahydrate | 30 | 85 | 46 | 77 |
| | Potassium iodide | 30 | | | |
| Reference example | Cupric sulfate | 30 | 53 | 43 | 24 |

TABLE 19-continued

| Completion and Workover Fluid | Additive | Amount Added (As elemental copper, elemental iodine) (ppm) | AV (cp) | PV (cp) | YP (lb/100 ft²) |
|---|---|---|---|---|---|
| | pentahydrate Potassium iodide | 30 | 32 | 28 | 6 |

EXAMPLE 20

A completion and workover fluid used hitherto which comprised 35 parts by weight of calcium chloride, 0.8 part by weight of the same hydroxyethyl cellulose as described in Example 1 and 65 parts by weight of water, and a completion and workover fluid of the present invention which was prepared by adding cupric sulfate pentahydrate in an amount of 15 ppm as elemental copper and sodium iodide in an amount of 10 ppm as elemental iodine to the above fluid were aged, respectively, in a Roller Oven at 140° C. for 16 hours. The rheological properties of the two fluids were then measured and the results obtained are shown in Table 20 below.

TABLE 20

| Completion and Workover Fluid | Specific Gravity | AV (cp) | PV (cp) | YP (lb/100 ft²) |
|---|---|---|---|---|
| Fluid used hitherto | 1.35 | 14 | 13 | 1 |
| Fluid of the present invention | 1.35 | 64 | 45 | 38 |

EXAMPLE 21

A completion and workover fluid used hitherto which comprised 35 parts by weight of calcium chloride, 0.4 part by weight of the same hydroxyethyl cellulose as described in Example 1 and 65 parts by weight of water, and a completion and workover fluid of the present invention which was prepared by adding cuprous chloride in an amount of 100 ppm as elemental copper and potassium iodide in an amount of 10 ppm as elemental iodine to the above fluid were aged, respectively, in a Roller Oven at 120° C. for 8 hours. The rheological properties of the two fluids were then measured and the results obtained are shown in Table 21 below.

TABLE 21

| Completion and Workover Fluid | Specific Gravity | AV (cp) | PV (cp) | YP (lb/100 ft²) |
|---|---|---|---|---|
| Fluid used hitherto | 1.35 | 10 | 9 | 0 |
| Fluid of the present invention | 1.35 | 45 | 40 | 13 |

EXAMPLE 22

A completion and workover fluid used hitherto which comprised 35 parts by weight of calcium chloride, 0.6 part by weight of the same hydroxyethyl cellulose as described in Example 1 and 65 parts by weight of water, and a completion and workover fluid of the present invention which was prepared by adding copper iodide in an amount of 40 ppm (13.4 ppm as elemental copper, 26.6 ppm as elemental iodine) to the above fluid were aged, respectively, in a Roller Oven at 140° C. for 8 hours. The rheological properties of the two fluids were then measured and the results obtained are shown in Table 22 below.

TABLE 22

| Completion and Workover Fluid | Specific Gravity | AV (cp) | PV (cp) | YP (lb/100 ft²) |
|---|---|---|---|---|
| Fluid used hitherto | 1.35 | 11 | 10 | 0 |
| Fluid of the present invention | 1.35 | 70 | 50 | 45 |

EXAMPLE 23

A completion and workover fluid used hitherto which comprised 27.5 parts by weight of calcium chloride, 27.2 parts by weight of calcium bromide, 0.5 part by weight of the same hydroxyethyl cellulose as described in Example 1 and 45.3 parts by weight of water, and a completion and workover fluid of the present invention which was prepared by adding cupric chloride in an amount of 5 ppm as elemental copper and sodium iodide in an amount of 7.5 ppm as elemental iodine to the above fluid were aged, respectively, in a Roller Oven at 120° C. for 8 hours. The rheological properties of the two fluids were then measured and the results obtained are shown in Table 23 below.

TABLE 23

| Completion and Workover Fluid | Specific Gravity | AV (cp) | PV (cp) | YP (lb/100 ft²) |
|---|---|---|---|---|
| Fluid used hitherto | 1.60 | 21 | 20 | 2 |
| Fluid of the present invention | 1.60 | 66 | 43 | 37 |

It is obvious from the above examples that the completion and workover fluids of the present invention are superior to those used hitherto in the rheological properties of the fluids.

While the invention has been described in detail and with reference to specific embodiments thereof, it will be apparent to one skilled in the art that various changes and modifications can be made therein without departing from the spirit and scope thereof.

What is claimed is:

1. A completion and workover fluid which comprises an aqueous liquid medium containing from about 0.2% by weight to about 2% by weight of hydroxyethyl cellulose, an inorganic salt selected from the group consisting of calcium chloride, calcium bromide and zinc bromide, and from about 0.001% by weight to about 0.2% by weight of a component selected from the group consisting of the following components:

(1) thiol derivatives of heterocyclic compounds selected from the group consisting of a benzoxazole-2-thiol of the formula (1), a N-pyridineoxide-2-thiol of the formula (2), a 1,3,4-thiadiazole-2,5-dithiol of the formula (3) and a 4-ketothiazolidine-2-thiol of the formula (4):

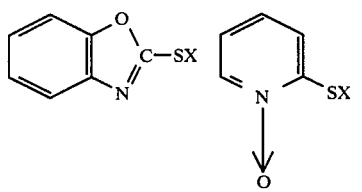

(1)  (2)

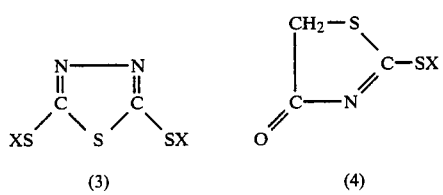

(3)  (4)

wherein X represents a hydrogen atom, an alkali metal atom or an ammonium;

(2) thioamide derivatives selected from the group consisting of thioacetamide, hydrazine carbothioamide and allyl thiocarbamide;

(3) dithiocarbamate compounds consisting of the following formula:

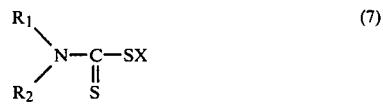

(7)

wherein $R_1$ and $R_2$, which may me the same or different, represent a lower alkali group, and X represents a hydrogen atom, an alkyl metal atom or an ammonium; and (4) benzothiazole.

2. A completion and workover fluid as in claim 1, wherein the lower alkyl group of component (3) is a methyl group or an ethyl group.

3. A completion and workover fluid as in claim 1 containing a component selected from the group consisting of components (1), (2), (3) and (4) in an amount ranging from about 0.005% by weight to about 0.1% by weight.

* * * * *